Sept. 11, 1951    L. J. GIACOLETTO ET AL    2,567,373
ELECTROSTATIC GENERATOR
Filed June 10, 1949
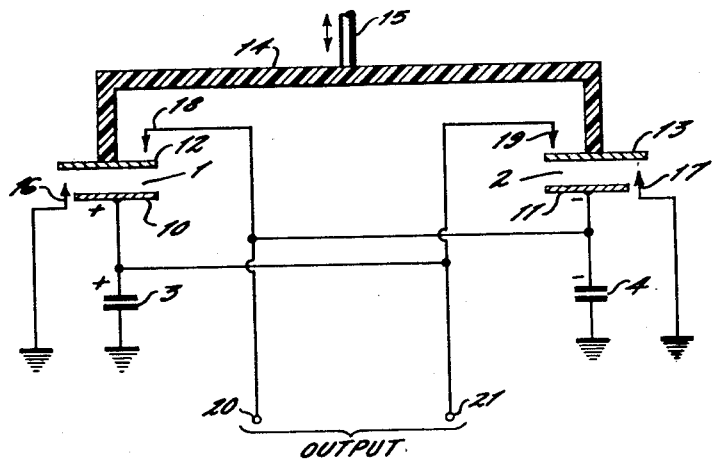
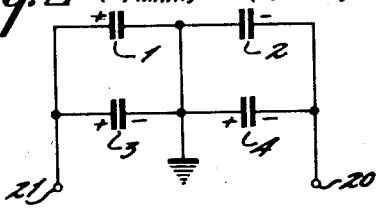
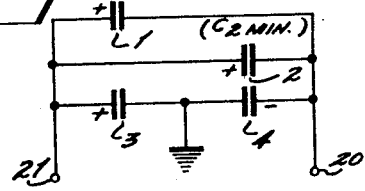
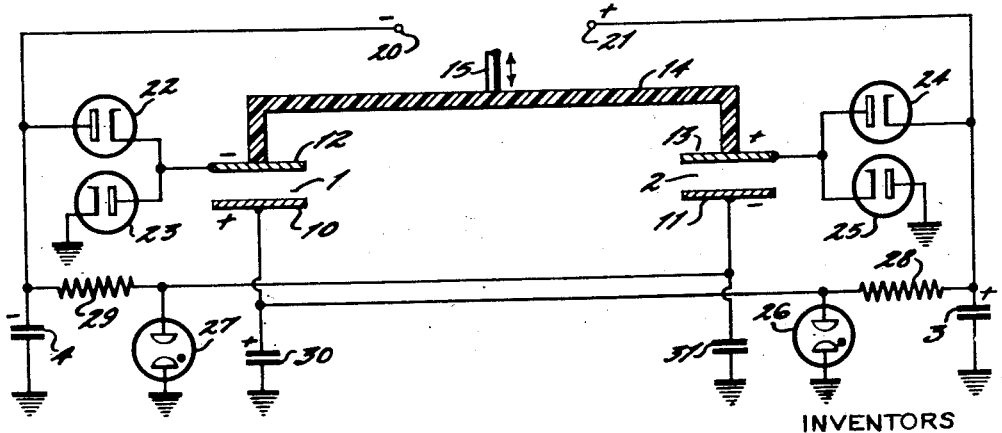
INVENTORS
Lawrence J. Giacoletto
& Irving Wolff
BY
ATTORNEY Patented Sept. 11, 1951

2,567,373

UNITED STATES PATENT OFFICE 2,567,373

ELECTROSTATIC GENERATOR

Lawrence J. Giacoletto, Eatontown, and Irving Wolff, Princeton, N. J., assignors to Radio Corporation of America, a corporation of Delaware Application June 10, 1949, Serial No. 98,304

10 Claims. (Cl. 171—97)

Our invention relates to electrostatic generators, and is particularly concerned with the type of electrostatic generator in which a variable condenser adjusted to maximum capacity is charged from a source of charging potential, after which the capacity of the condenser is decreased and the condenser discharged in a high voltage, low capacitance condition.

In electrostatic generators of this type, the potential at which the condenser is discharged is a multiple of the charging potential, the factor of multiplication being the ratio between the maximum and minimum capacities of the condenser. The output voltage thus bears a fixed relationship to the charging voltage.

It is a general object of our invention to provide for cyclically charging and discharging a variable condenser at progressively higher potentials.

Another object of our invention is to provide improved mechanism for converting mechanical energy to changes in condenser capacity, and, thus, to convert mechanical energy to electrical energy.

According to our invention, the foregoing and other objects and advantages are attained by discharging the variable condenser into a charge storing means and then, after adjusting the condenser to the maximum capacity condition, recharging the condenser from the storage means at a potential higher than that at which it was originally charged. Therefore, the generator of our invention is capable of building up a potential across the storage means whose value is limited only by charge leakage and by the amount of energy which is transferred from the system to a load. Furthermore, in accordance with our invention, it is possible to use a very low charging potential, and it is even possible to dispense entirely with a separate charging source, since a very low residual or stray charge may be built up rapidly to a useful level.

A more complete understanding of the invention can be had by reference to the following detailed description and to the drawings, in which:

Figure 1 is a schematic diagram of a generator arranged in accordance with the invention;

Figure 2 is an illustration of the circuit connections existing in the generator at the instant when the variable condensers are being charged;

Figure 3 illustrates the circuit connections in the generator at the instant when the variable condensers are being discharged; and Figure 4 illustrates a modification of the generator of Figure 1, including means for stabilizing the polarity and magnitude of output voltage of the generator.

The qualitative operation of the device may best be understood by referring to Figure 1, in which will be seen a pair of variable condensers 1, 2, each comprising a fixed lower plate 10, 11, and a movable upper plate 12, 13. The upper plates 12, 13 are mechanically interconnected by an insulating bar 14 which, in turn, is to be coupled to any suitable reciprocatory drive mechanism (not shown) through a link 15. The bottom plate 10 of the condenser 1 is connected to ground through a fixed condenser 3, and the bottom plate 11 of the condenser 2 is similarly connected to ground through a fixed condenser 4. A pair of fixed contact members 16, 17 serve to connect the upper plates 12, 13 to ground when the variable condensers 1, 2 are in the maximum capacity position, that is, when the plates 12, 13 are at the limit of their downward movement.

A second pair of fixed contacts 18, 19, arranged to engage the plates 12, 13 at the upper extreme of their movement, serve to connect the plate 12 to the ungrounded terminal of the condenser 4 and to an output terminal 20, and to connect the plate 13 to the condenser 3 and to an output terminal 21.

Considering the operation of the device from a starting position in which the plates 12, 13 are at the lower extreme of their movement, Figure 2 illustrates the condition of the device at the beginning of each cycle of operation. As will be seen in Figure 2, the fixed and variable condensers 1, 3 are connected in parallel, the fixed and variable condensers 2, 4 are also connected in parallel, and the two parallel combinations are in series across the output terminals 20, 21. One half of a "mechanical" cycle later, that is, when the plates 12, 13 are at the upward limit of their movement, the apparatus will be in the condition illustrated in Figure 3. The condensers 1, 2, whose capacity has now been decreased, are now in parallel with one another, and also in parallel with the series combination of the fixed condensers 3, 4.

Referring again to Figure 1, a complete cycle of operation will now be described. Assume that the capacitors 1, 2 are in the maximum capacity condition, and that there is a positive charge $Q_1$ on the upper plate of the condenser 3. Then the potential $V_1$ across the condenser 3 will be $$\frac{Q_1}{C_3}$$

where $C_3$ is the capacitance of the condenser 3. This same potential will also exist across the condenser 1, as may be seen from Figure 2. When the left plate 12 moves upwardly, breaking connection with the contact 16, the voltage on the plate 12 will increase negatively with respect to the ground. Let $C_{1\,max.}$ and $C_{1\,min.}$ represent the maximum and minimum capacitances of the condenser 1, respectively, and let $d$ represent the ratio $$\frac{C_{1\,max.}}{C_{1\,min.}}$$

If the ratio $d$ is large, the potential difference between the plates 10, 12 will also be large when the plates are separated, and almost all of the charge on the condenser 1 will be transferred through the contact 18 to the condenser 4, which will become charged negatively to a voltage approximately $(-)V_1$, assuming that $C_3$ equals $C_4$ (where $C_3$ and $C_4$ represent the capacitance of the condensers 3 and 4, respectively).

Now, when the plate 13 comes down, a positive charge will be induced thereon by the flow of electrons out of the condenser 2 through the contact 17, and this positive charge will be transferred to the condenser 3 when the plate 13 again engages the contact 19.

Thus, as the plates 12, 13 move up and down, negative charge will be transferred by the plate 12 to the condenser 4 and positive charge will be transferred by the plate 13 to the condenser 3.

A quantitative analysis of the operation of the generator shown in Fig. 1 may be made by assuming that $C_{1\,max.}$ equals $C_{2\,max.}$, and that $C_3$ equals $C_4$. For simplicity, assume a cycle of operation commencing with a potential $+V_1$ across the condenser 3 in Figure 2, and a potential $-V_1$ across the condenser 4. The same potential, $V_1$, will exist across the condensers 1, 2, in Fig. 2, as has been described above, and upon separation of the plates 10, 12, and 11, 13 of the variable condensers 1, 2, respectively, the potential across each of the condensers 1, 2 will increase to a value $dV_1$. If the ratio $d$ has a value greater than two, charge will then be transferred from the condensers 1, 2, in parallel, to the condensers, 3, 4, in series, when the discharging circuit connections are made as illustrated in Figure 3. The potential $V_2$ then appearing between the terminals 20, 21 will have some value between $dV_1$ and $2V_1$. As the condition illustrated in Figure 2 is again reached, the potential across the condensers 1 and 2 will have been reduced to the value $$\frac{V_2}{d}$$

while the potential across the condensers 3, 4 will still be $$\frac{V_2}{2}$$

so that the potential $V_3$ which then appears across the condensers 1, 3, in parallel, will have a value between $$\frac{V_2}{d} \text{ and } \frac{V_2}{2}$$

In terms of $r$ and $d$, where $r$ is the ratio $$\frac{C_3}{C_{1\,max.}}$$

the ratio between the new potential $V_3$ across the condenser 3 and the original potential $V_1$ will be:

$$\frac{V_3}{V_1} = \frac{(r+2)(rd+2)}{(r+1)(rd+4)}$$

It will be seen that the right-hand quotient of this expression (i. e.

$$\frac{rd+2}{rd+4})$$

will approach unity as $d$ is increased, and that the left-hand quotient (i. e.

$$\frac{r+2}{r+1})$$

will approach unity when $r$ is increased. On the other hand, when $d$ is much greater than unity and $r$ is much less than unity, the value of this expression approaches two as a limit. As a practical matter, values very close to the limit require extremely small values of $r$, which, in turn, means that the condensers 3, 4 would be insufficiently large to store useful amounts of energy.

For practical values of $r$, the ratio $$\frac{V_3}{V_1}$$

increases asymptotically with increasing $d$, and increases in $d$ beyond, say, 4 to 10, are not remunerative. This is particularly true since the value $$\frac{V_3}{V_1}$$

is the multiplication per cycle, and, as a consequence, moderate values for this expression result in rather rapid increases in potential if the device is operated at a high cyclic rate.

The power handling capability of the generator is dependent, in part, upon the absolute value of maximum capacity of the condensers 1, 2, and in order to convert relatively large amounts of mechanical power to electrical power it may be desirable to employ variable condensers embodying solid dielectric, for example, of the type described in the copending application of Lawrence J. Giacoletto, Serial No. 98,303, filed June 10, 1949, and assigned to the assignee of the present invention.

When the operating potential is high, it is desirable to time the switching operations with great accuracy, and it is particularly important that the engagement between the plates 12, 13 and the contacts 16, 17, respectively, be broken as soon as the upward movement of the condenser plates begins, since the potential on the plate 12 can change only after the connection to ground is broken. An arrangement of mechanical contacts providing for a high degree of accuracy and an arrangement of electronic switching applicable to the present invention are both disclosed in the copending application to which reference has just been made.

Another aspect of high voltage operation to which particular attention is directed is the problem of ionization of the air between the plates of the variable condensers 1, 2 when the capacities of the condensers are decreased. If the initial spacing of the condenser plates is such as to provide a potential gradient lower than the ionization potential of air, but the voltage due to decrease in capacity increases more rapidly than the spacing between the plates, the ionization potential of air may be exceeded, and arcing over may occur. In variable condensers of the type in which one plate is shifted parallel to the other to decrease the capacity, the potential difference may increase enormously with no increase in plate spacing, and, hence, the initial spacing of the condenser plates must be sufficiently great to withstand a potential equal to the product of the charging potential and the factor of capacity decrease. However, in the electrostatic generator of our invention, wherein the condenser plates are separated in a path perpendicular to the plates, the initial spacing between the plates need be only sufficient to withstand the charging potential after steady operating conditions have been reached and need not withstand the maximum potential across the variable condensers which, where the distance is large, will be enormously greater than the output potential of the generator.

Because of the much closer initial spacing of the condenser plates which is possible in our generator, the maximum capacity of the variable condenser can be relatively large, and the power output of the device may also be relatively large as compared to generators embodying variable condensers of the same physical size but in which the capacity is decreased by shifting the plates in parallel planes.

In the form of the invention illustrated in Figure 1, the polarity of the output potential is determined by the polarity of the initial charge across the condensers, and, since the polarity of the initial charge is unpredictable, the polarity of the output voltage cannot be predicted. However, where a particular polarity is desired for a particular purpose, a small charge of proper polarity can be applied to one of the condenser plates.

In Figure 4, we have illustrated an arrangement in which uni-directional conducting devices are used to accomplish the switching operation in such a way that the charges on the various condensers will always be maintained in a predetermined pattern of polarity. We have also illustrated means for stabilizing the output potential. By stabilization in this connection is meant the manitenance of the output voltage of the generator within a predetermined range.

In the arrangement of Figure 4, condensers 1, 2, 3, and 4 are arranged in a manner similar to that illustrated in Figure 1, except that electronic switching has been substituted for the mechanical switching of Figure 1, and voltage regulator tubes are employed to stabilize the output potential.

In Figure 4, the upper plate 12 of the condenser 1 is connected to the upper plate of the condenser 4, and to the negative output terminal 20, by a unidirectional device 22, which may be, for example, a thermionic diode arranged to permit the flow of electrons only from the plate 12 to the output terminal 20. The plate 12 is also connected to ground through a similar unidirectional device 23 which is arranged to permit the flow of electrons only from ground to condenser plate 12. Assuming that the upper plate 12 is at ground potential when the condenser 1 is in the maximum capacity position, it will be seen that as the plate 12 moves upwardly its potential will fall below ground potential, and, hence, no current will flow through the unidirectional device 23. On the other hand, electrons will flow away from the plate 12 through the unidirectional device 22 to the condenser 4 and to the output terminal 20. This condition continues until the condenser plate 12 reaches the upper limit of its travel and begins its downward movement, at which moment its potential will fall below that of the output terminal 20 and the unidirectional device 22 will become non-conducting. Due to the loss of charge through the unidirectional device 22 during upward movement, the condenser plate 12 will, at some point in its downward movement, rise to ground potential, at which moment electrons will begin to flow through the unidirectional device 23 from ground and so prevent a further increase in potential. Since, by a similar cycle of operation on the right-hand side of the network shown in Figure 4, the condenser 3 will have received a positive charge from the plate 13, the lower plate 10 of the condenser 1 will receive a charge at a higher potential than that existing at the beginning of the cycle. Thus, the unidirectional devices 22, 23, and their counterparts 24, 25, not only serve to accomplish the necessary switching operations, but also serve to stabilize the polarity of the output potential of the device.

The output potential of the generator may be stabilized by voltage regulator tubes 26, 27, which may be of the gas ionization type, for example, which are connected in series with two resistors, 28 and 29, respectively, across the charge storing condensers 3 and 4. The voltage regulators 26, 27 operate in the usual manner to limit the voltage across the charge storing condensers 3, 4 by permitting the passage of current when the potential across them exceeds a certain predetermined value. Capacitors 30, 31 can be connected in parallel with the tubes 26, 27, to further stabilize the operation of the device.

In connection with the driving mechanism employed to vary the capacity of condensers 1 and 2, we prefer to employ the type of mechanism disclosed in the copending application to which reference has already been made, the said drive mechanism embodying a drive element adapted to be reciprocated by an electromagnetic device operated by alternating or pulsating current. Preferably, the drive mechanism is mechanically tuned to resonance at the frequency of the driving current. In this way, a relatively small amount of power can be applied to the variable condensers with a relatively large amplitude of physical displacement of the plates.

Since many changes could be made in the apparatus shown and described, all within the scope and spirit of the invention, the foregoing is to be construed as illustrative, and not in a limiting sense.

What we claim is:

1. An electrostatic generator comprising a pair of condensers connected in series, a first variable condenser, a second variable condenser, means for synchronously moving the plates of said variable condensers toward and away from one another to vary the capacities of said variable condensers between maximum and minimum values, the maximum capacity of each of said variable condensers being more than twice as great as the minimum capacity thereof, and switching means to connect each of said variable condensers in parallel with one of said pair of condensers when said variable condensers are in the maximum capacity condition and to connect both of said variable condensers in parallel with said pair of condensers in series when said variable condensers are in the minimum capacity conditions.

2. An electrostatic generator as defined in claim 1 in which the capacity of each of said pair of condensers is smaller than the maximum capacity of each of said variable condensers.

3. An electrostatic generator as defined in claim 1 in which the ratio of maximum to minimum capacity of each of said variable condensers is much greater than unity, and in which the ratio of the capacity of one of said pair of condensers to the maximum capacity of one of said variable condensers is much smaller than unity.

4. An electrostatic generator comprising variable condenser means including parallel plates movable toward and away from one another to increase and decrease the capacity of said variable condenser means, fixed condenser means, means for transferring charge from said fixed condenser means to said variable condenser means when the latter is in increased capacity condition, and means for transferring charge from said variable condenser means to said fixed condenser means when said variable condenser means is in decreased capacity condition.

5. A generator as defined in claim 4 in which the maximum potential gradient between said plates exists when said variable condenser means is in a maximum capacity condition.

6. A generator as defined in claim 4 in which said charge transferring means comprises a circuit connection which opens and closes in synchronism with mechanical movement of one of said plates.

7. A generator as defined in claim 4 in which said charge transferring means comprises an electron discharge device.

8. A generator as defined in claim 4 in which said fixed condenser means comprises a pair of condensers connected in series, in which said variable condenser means comprises a pair of separate variable condensers, and in which said charge transferring means includes circuit elements to connect said variable condensers in series across a load when said variable condensers are in maximum capacity condition and to connect said variable condensers in parallel across said load when said variable condensers are in minimum capacity condition.

9. An electrostatic machine comprising a first and a second fixed condenser each having a pair of plates, one plate of each of said condensers being grounded, first and second variable condensers each having a pair of plates, one plate of said first variable condenser being connected to the other plate of said first fixed condenser, and the second variable condenser being similarly connected to the second fixed condenser, means for varying the capacity of said variable condensers in synchronism, output connections to said other plates of said two fixed condensers, and switch means for (1) grounding the other plates of said variable condensers when said variable condensers are in the maximum capacity condition, and for (2) connecting the other plate of said first variable condenser to said other plate of said second fixed condenser and for similarly connecting said second variable condenser and said first fixed condenser when said variable condensers are in the minimum capacity condition.

10. In an electrostatic machine, in combination, a pair of output terminals, a pair of fixed condensers, one of said condensers being connected between ground and one of said output terminals and the other of said condensers being connected between ground and the other of said output terminals, a pair of variable condensers each having a pair of plates, one plate of each variable condenser being connected to an output terminal, means for simultaneously increasing and decreasing the capacity of said two variable condensers, and switch means for grounding the other plates of said variable condensers when in maximum capacity condition, and for connecting the other plate of each variable condenser to the opposite output terminal when the variable condensers are in the minimum capacity condition.

LAWRENCE J. GIACOLETTO.
IRVING WOLFF.

REFERENCES CITED

The following references are of record in the file of this patent:

UNITED STATES PATENTS

| Number | Name | Date |
| --- | --- | --- |
| 1,559,656 | Thorp | Nov. 3, 1925 |
| 2,413,391 | Usselman | Dec. 31, 1946 |
| 2,417,452 | Stiefel | Mar. 18, 1947 |